United States Patent [19]

Kudou et al.

[11] Patent Number: 4,890,543

[45] Date of Patent: Jan. 2, 1990

[54] LIGHT METAL PISTON FOR INTERNAL COMBUSTION ENGINES AND METHOD OF MAKING THE SAME

[75] Inventors: Masaaki Kudou, Kumagaya; Tosio Ogiwara, Gyoda, both of Japan

[73] Assignee: Izumi Automotive Industry Co., Ltd., Kawagoe, Japan

[21] Appl. No.: 93,242

[22] Filed: Sep. 4, 1987

[30] Foreign Application Priority Data

Nov. 25, 1986 [JP] Japan .......................... 61-179773[U]

[51] Int. Cl.⁴ .............................................. F16J 1/04

[52] U.S. Cl. ...................................... 92/228; 92/225; 29/156.5 R; 164/98; 123/193 P

[58] Field of Search ................. 92/225, 226, 227, 228, 92/292, 230, 195; 29/156.5 R, 527.5; 164/98, 112; 123/193 P

[56] References Cited

U.S. PATENT DOCUMENTS

| | | | |
|---|---|---|---|
| 3,908,521 | 9/1975 | Cockcroft | 92/225 |
| 4,074,617 | 2/1978 | Cockcroft | 92/228 |

FOREIGN PATENT DOCUMENTS

| | | | |
|---|---|---|---|
| 1030143 | 5/1958 | Fed. Rep. of Germany | 29/156.5 R |
| 1077036 | 3/1960 | Fed. Rep. of Germany | 29/156.5 R |
| 1245657 | 7/1967 | Fed. Rep. of Germany | 92/226 |
| 0817823 | 9/1937 | France | 92/230 |
| 1241049 | 4/1960 | France | 29/156.5 R |
| 0471815 | 3/1952 | Italy | 92/228 |
| 0227964 | 1/1985 | Japan | 164/98 |
| 0306228 | 2/1929 | United Kingdom | 92/228 |
| 0429145 | 5/1935 | United Kingdom | 92/226 |

*Primary Examiner*—Robert E. Garrett
*Assistant Examiner*—Thomas Denion
*Attorney, Agent, or Firm*—William D. Hall

[57] ABSTRACT

A light metal piston for internal combustion engines has a pair of inserts on the inside of upper piston skirt made of a material of lower thermal expansion coefficient than that of the light metal, such as steel. Each insert has a pair of bands which are joined by a connecting portion of the insert in the region of the gudgeon pin boss. Each band extends circumferentially away from the gudgeon pin boss, so as to control thermal expansion of the piston skirt. A free end of each band are bent inwardly, so that the insert can be set firmly on the mold core of the piston during casting operation by snapping the bent portions of the insert into the grooves on the mold core.

19 Claims, 5 Drawing Sheets

LIGHT METAL PISTON FOR INTERNAL COMBUSTION ENGINES AND METHOD OF MAKING THE SAME

FIELD OF THE INVENTION

The present invention relates to a light metal piston for internal combustion engines which has a pair of steel inserts cast-in on the inside of the piston skirt in order to control thermal expansion of the piston skirt, and to a method of making the same.

BACKGROUND OF THE INVENTION

In an internal combustion engine, this type of piston has a crown, a skirt, a pair of gudgeon pin bosses, and a pair of inserts made of a material of lower thermal expansion than that of the light metal, such as steel. Each insert is and shaped so that at least part of the insert conforms to the inside shape of the piston skirt, whereby to form a bi-metallic element with the light metal of the piston in order to control the expansion of the piston skirt, when the piston is heated during engine operation, each insert has a pair of bands extending around the inside of the piston skirt from the region of the gudgeon pin boss, and the bands of said pair are joined by a connecting portion of the insert in the region of the gudgeon pin boss.

In a prior method of making such a piston, permanent magnets are firmly fixed in recesses of the mold core where the inserts are to be set, and the inserts are positioned firmly on the mold core during casting operation by the magnetic force. However, the magnetic force decreases gradually due to high temperature during casting operation and then the inserts tend to fall off from the mold core when a molten metal is poured into the mold cavity.

When the piston is cast by the squeeze casting process, in which a very high pressure around 1,000 $kg/cm^2$is applied in the molten metal, the heat flux from the molten metal into the mold core is accelerated because of better contact between the molten metal and the mold core. Therefore, the magnet is exposed to higher temperature and the magnetic force decreases very rapidly. Consequently, the magnet on the mold core for squeeze casting must be replaced at every 500 to 1000 casting cycles, which increases the production cost of the squeeze-cast piston with cast-in steel inserts remarkably.

In a second prior method of making such a piston, two setting pins per one insert are fixed in the mold core. Two setting holes are drilled at the corresponding position of the insert, and the inserts are positioned on the mold core by the engagement of setting pins on the mold core and holes of the inserts.

In gravity die casting process, the mold core for the piston is normally divided into several pieces, so that the mold core can be freely taken out from the piston casting after the molten metal solidifies, even if the piston inside has under-cut portions of if there is such engagement of setting pins and holes of the inserts.

In case of squeeze casting process, the mold core must be of one piece, because a very high pressure on the moltenmetal would press the melt into every gap between the divided mold core pieces, which would hinder the mold core from taking out from the piston casting. Thus, it is impossible to apply such setting pins for casting pistons with steel inserts by squeeze casting process.

SUMMARY OF THE INVENTION

It is therefore an object of the present invention to avoid the above-mentioned problems and other disadvantages of conventional light metal piston for internal combustion engines of the type discussed above and method of making the same.

More particularly, it is an object of the invention to provide an improved completely new method of making a light metal piston with expansion controlling steel inserts which does not require the conventional setting devices for steel inserts any more, and which offers the easy and reliable setting of steel inserts.

According to the present invention, a light metal piston for internal combustion engines has a crown, a skirt and gudgeon pin bosses, and a pair of inserts made of a material of lower thermal expansion coefficient than that of the light metal, such as steel sheet material. Each insert has a pair of bands joined by a connecting portion of the insert in the region of the gudgeon pin boss. The bands extend circumferentially away from the gudgeon pin boss so as to control thermal expansion of the piston skirt. The free ends of the bands have bent portions which are bent inwardly by the angle of about 90 degrees. On the mold core, the grooves are provided to accept the bent portions of the inserts. The inserts are pressed against the mold core and the inner faces of the bent portions snap at the grooves on the mold core, whereby to sustain the inserts firmly in the grooves by the elasticity of the steel inserts, when a molten metal is poured into the mold cavity.

Consequently, in the present invention, falling off of the inserts during casting operation is completely eliminated. In addition, maintenance costs of the mold can be drastically reduced, because it is not necessary to replace the magnets or setting pins for fixing the inserts to the mold core in the prior methods. Furthermore, automatic setting of the inserts can now be introduced to reduce production cost, because the setting operation is very simple and reliable.

The above and other objects, features and advantages of the present invention will become more apparent from the following description when taken in conjunction with the accompanying drawings in which a number of preferred embodiments of the present invention are shown by way of illustration examples.

DETAILED DESCRIPTION OF THE PREFERRED EMBODIMENT

A number of embodiments of the present invention will now be described with reference to the accompanying drawings.

Figure 1:
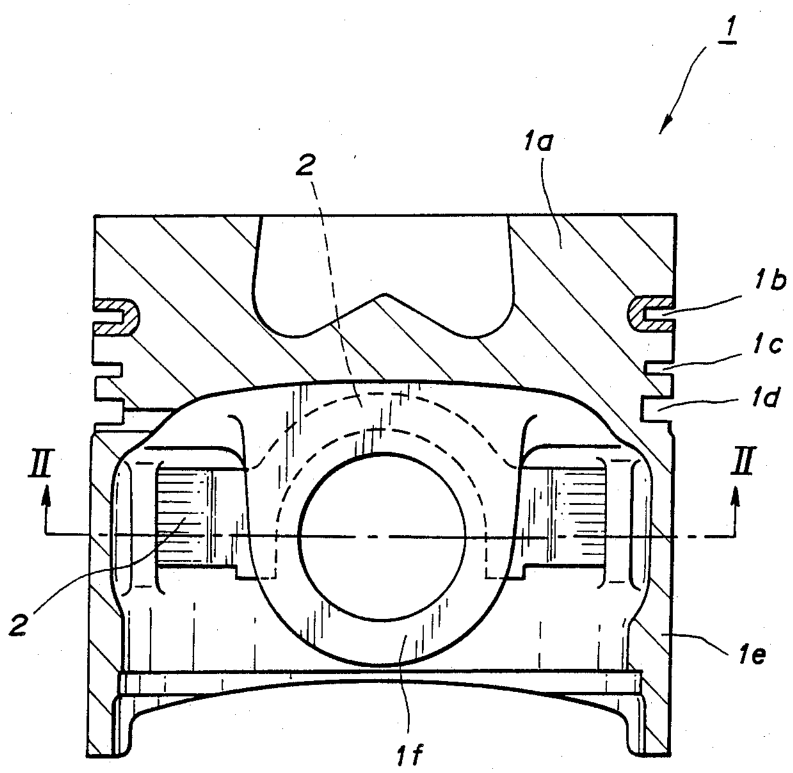
FIG. 1 is a longitudinal cross-section of a piston according to the present invention.
Figure 2:
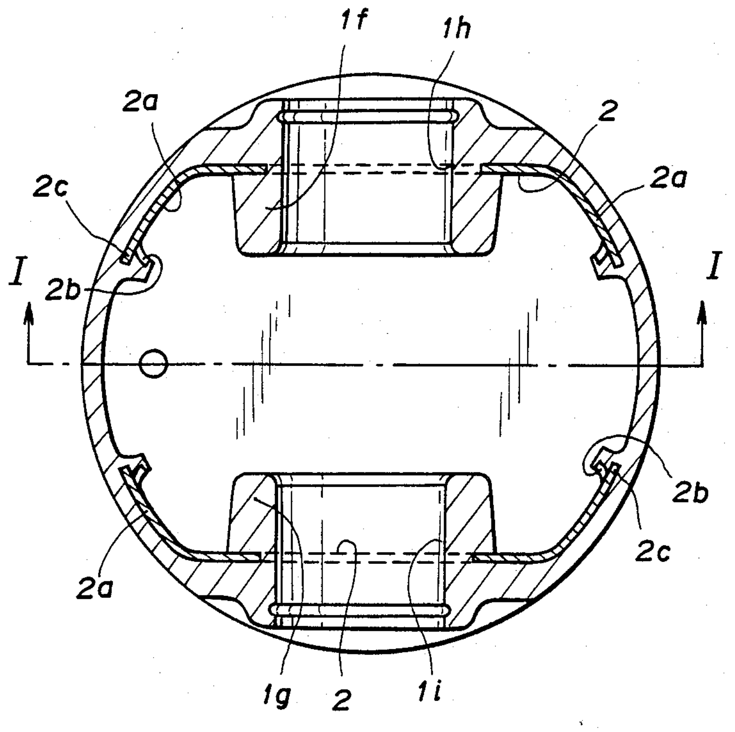
FIG. 2 is a section on the line II—II of FIG. 1.

As shown in FIG. 1, the piston 1 has a crown 1*a*, ring groove bands 1*b*, 1*c* and 1d around the periphery of the crown 1*a*, and a skirt 1*e* integrally connected to the crown 1*a*. The piston has a pair of gudgeon pin bosses 1*f*, 1*g* which are formed so as to extend inwardly from the piston skirt 1*e* and which are connected to the crown 1*a* by a pillar on the piston skirt 1*e*. Bores 1*h*, 1i receive the gudgeon pin are formed in the bosses 1*f*, 1*g* respectively. The piston 1 is made of light metal, for example, aluminum alloy or magnesium alloy, and is provided with a pair of inserts 2, 2 made of sheet steel, extending circumferentially away from the gudgeon pin bosses 1*f*, 1*g*, in order to control thermal expansion of the piston skirt 1*e* which results from the heating of the piston 1 from room temperature to its operating temperature in an engine.

Figure 3:
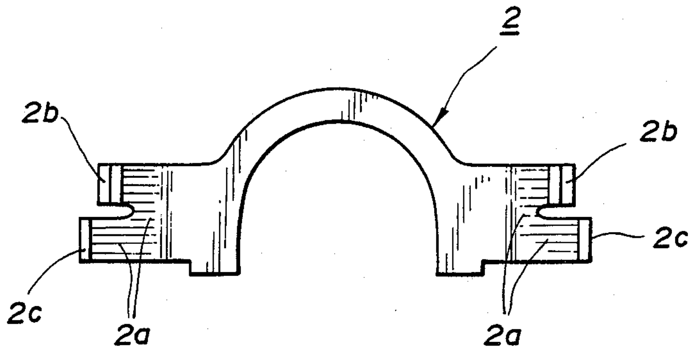
FIG. 3 is an elevation view of a first preferred embodiment of a insert for use in the piston according to the invention.
Figure 4:
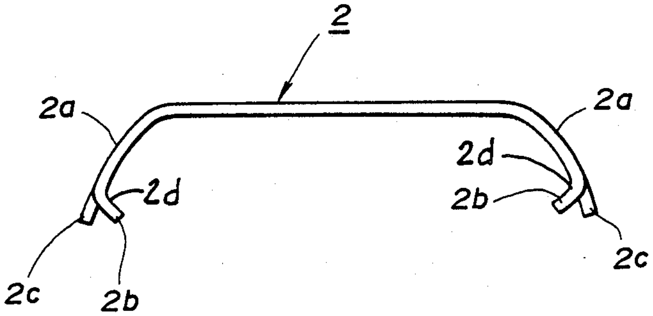
FIG. 4 is a plan view of the insert of FIG. 3.
Figure 5:
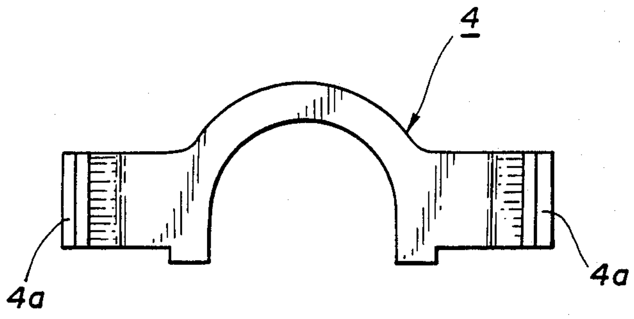
FIG. 5 is an elevation view of a second preferred embodiment of a insert for use in the piston according to the invention.
Figure 6:
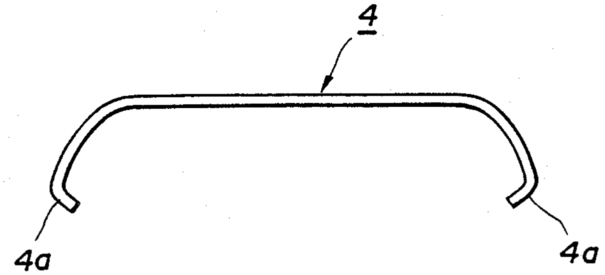
FIG. 6 is a plan view of the insert of FIG. 5.

The inserts 2, 4 shown in FIG. 3 and 5, consist of a pair of bands having regions 2*a*, 2*a* extending circumferentially around the inside of the piston skirt 1*e*, and a connecting portion joining the two bands.

At least a portion 2*b*, 4*a* of the free end of each band 2, 4 is bent inwardly by the angle of about 90 degree.

The radial length of the bent portions 2*b*, 4*a* should not be less than the thickness of the insert, because in the case of a short bent portion the bending of the insert becomes difficult and the holding force of the bent portions 2*b*, 4*a* during casting becomes weaker. The maximum radial length of the bent portions 2*b*, 4*a* should not exceed 10 times of the thickness of the insert 2, because the holding force of the bent portions 2*b*, 4*a* does not increase any more and the snapping of the insert 2 at the mold core becomes more difficult. The vertical length of the bent portions 2*b*, 4*a* can be varied depending on the circumstances, for example only a part of the free end can be bent to ease the bending operation.

If only an upper half 2*b* of the free end should be bent as shown on FIG. 3, it would be better to cut out the boundary area between the bent portion 2*b* and the not-bent portion 2c, in order to ease the bending operation and to eliminate the sharp edge at the boundary area which may cause a crack in the piston 1.

Figure 7:
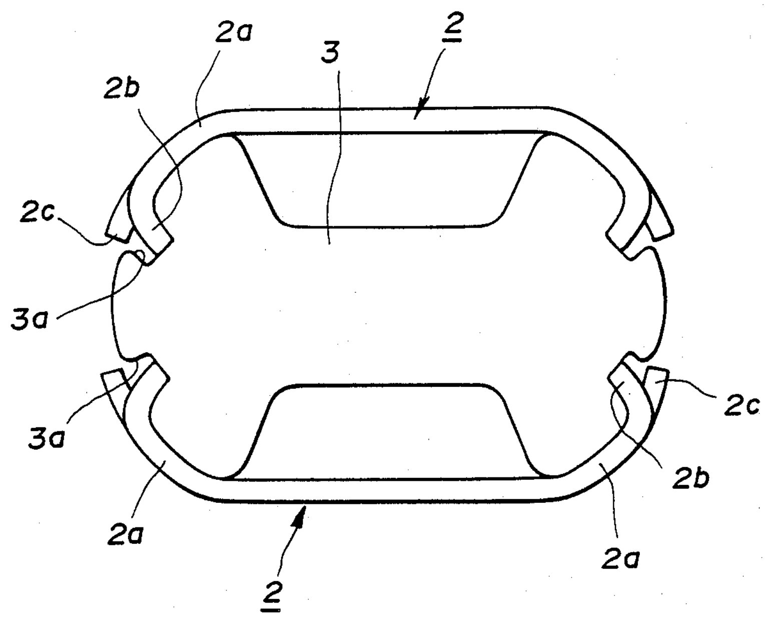
FIG. 7 is a plan view of fixing the insert to the mold core according to the invention.

Shown in FIG. 7, on the mold core 3, the grooves 3a, 3a are provided to accept the bned portions 2*b*, 2*b* of the insert 2. The inserts 2, 2 are pressed against the mold core 3 and the inner faces 2*d* of the bent portions 2*b*, 2*b* snap into the grooves 3*a*, 3*a* on the mold core 3, whereby to sustain the inserts 2, 2 firmly on the mold core 3 by the elasticity of the steel inserts 2, 2, and a molten metal poured into the mold 3 to form the piston 1.

FIG. 5 shows a second preferred embodiment of the insert 4 according to the present invention which is identical with that of FIG. 3, except that the entire vertical length of the free end is bent inwardly.

Each insert 2 or 4, as the case may be, has a connecting portion embedded in a gudgeon pin boss 1f (or 1g), and has a pair of bands such as 2*a*, for example, with each band having a bent portion such as 2*b* or 4*a*.

As mentioned above, according to the present invention, falling off of the inserts 2, 4 during casting operation is completely eliminated, and maintenance costs of the casting mold can be drastically reduced, because it is not necessary to replace the magnets or setting pins for fixing the inserts to the mold core. In addition, automatic setting of the inserts can be introduced to reduce production cost becuase the setting operation is very simple and reliable.

Furthermore, this method of holding the inserts on the mold core can be applied to cast pistons by gravity die casting or squeeze casting, but it is more advantageous to apply it to the squeeze casting process, because conventional method of holding the inserts on the mold core during casting cannot be applied economically to the piston production.

Obviously, numerous modifications and variations of the present invention are possible in the light of the above teachings. It is therefore to be understood that within the scope of the appended claims, the invention may be practiced otherwise than as specifically described herein.

What is claimed is:

1. A light metal piston for internal combustion engines, having a crown, a skirt integrally connected to said crown, a pair of gudgeon pin bosses, and a pair of expansion control inserts made of a material of lower thermal expansion coefficient than that of the light metal, each insert conforming to the internal shape of the piston skirt, each said insert having:

a connecting portion embedded in a gudgeon pin boss;

a pair of bands, being joined by said connecting portion, and each extending from said connecting portion and conforming to said internal shape of said skirt to form a bimetallic element therewith; each band having a free end, and a pair of bent portions, one at the free end of each band, each free end being bent inwardly so that said free ends fit into grooves in a moldcore and form means for fastening said bands to a moldcore during a casting operation.

2. A light metal piston as claimed in claim 1 wherein said bend portions of said insert are bent inwardly only at an upper half of said free ends.

3. A light metal piston as claimed in claim 1 wherein said bent portions of said insert are bent inwardly over the entire length of said free ends.

4. A light metal piston as claimed in claim 3 wherein the radial length of said bent portion in radial direction of the piston is less than the thickness of said insert.

5. A light metal piston as claimed in claim 3 wherein the maximum radial length of said bent portion in piston radial direction is not in excess of 10 times of the thickness of said insert.

6. A light metal piston as claimed in claim 2 wherein said free ends of said insert are cut out at a boundary area between said bent portion and the not-bent portion.

7. A light metal piston as claimed in claim 2 wherein said bent portion is bent by an angle between 60° and 120°.

8. A light metal piston comprising:

a cast metal element having a cylindrical body with an inner wall and also having the following parts all of which are integral with said body and with each other: a crown, a skirt and two gudgeon pin bosses, first and second means for controlling thermal expansion of said body when it is heated, each said means comprising a pair of bands and a connecting portion for interconnecting said bands, said connecting portion and its two bands constituting a unitary element, the connecting portion of one of said means being associated with and complementary to one of said bosses, and the connecting portion of the other of said means being associated with and complementary to the other of said bosses, each said connecting portion being substantially entirely embedded within, and extending about half way around, its complementary boss, the two bands associated with each connecting element extending, in opposite directions respectively, away from the boss in which the connecting element for the bands is embedded, and along said inner wall, each said band terminating in an end portion at least a part of which is at an angle to an adjacent portion of the band, and in which said part of each of said end portions turn inwardly of the piston and away from said inner wall.

9. A light weight piston as defined in claim 8 in which said body was cast, using a mold, and is composed of a material selected from the group consisting of aluminum and magnesium and in which said bands and their connecting portions are steel;

said steel bands being elastic so that when the piston is cast the elasticity of the steel bands will hold said end portions onto the mold and correctly position said bands and said connecting portions during the casting of the body of the piston.

10. A light weight piston as defined in claim 8 in which at least one said end portion comprises at least two spaced fingers at least one of which is at an angle to the band.

11. A light weight piston as defined in claim 10 in which the entire end portion of each band is at an angle to an adjacent portion of the band.

12. In a piston:

a cylindrical body with an inner wall and composed of molded metal having a crown and first and second bosses, and means for controlling thermal expansion of said body comprising first and second inserts associated with said first and second bosses respectively, each insert comprising two bands extending along said inner wall in opposite directions respectively from the boss with which the insert is associated, and each insert also including a connecting member interconnecting the two bands of the insert, each connecting member being embedded in-situ in the boss with which the insert is associated, each insert having free end portions that comprise resilient holding means for holding the insert onto a mold core so that the insert may be properly positioned during the molding of said body.

13. In a piston as defined in claim 12:

each said free end portion, being positioned at an angle to the portion of the band adjacent to such free end portion, and being directed away from the inner wall of the body.

14. In a piston as defined in claim 12.

said body having an interior, each free end which is divided into at least two fingers at least one of portion being at an angle to the portion of the band adjacent to the fingers and is pointing toward the interior of said body.

15. In a piston as defined in claim 14 in which said free end is at least as long as the thickness of the insert.

16. In a piston as defined in claim 15 in which the length of said free end does not exceed ten times the thickness of said insert.

17. In a piston as defined in claim 12:

said body having an interior, each free end in its entireity being at an angle to the portion of the band adjacent to said free end, each free end pointing toward said interior.

18. In a piston as defined in claim 17 in which said free end is at least as long as the thickness of the insert.

19. In a piston as defined in claim 18 in which the length of said free end does not exceed ten times the thickness of said insert.

* * * * *